United States Patent [19]

Pfeil et al.

[11] Patent Number: 5,708,059
[45] Date of Patent: Jan. 13, 1998

[54] STABLE, AQUEOUS EPOXY RESIN DISPERSIONS, PROCESSES FOR THEIR PREPARATION, AND THEIR USE

[75] Inventors: Armin Pfeil; Michael Hoenel, both of Wiesbaden; Uwe Neumann, Bad Schwalbach, all of Germany

[73] Assignee: Hoechst Aktiengesellschaft, Frankfurt, Germany

[21] Appl. No.: 798,759

[22] Filed: Feb. 11, 1997

Related U.S. Application Data

[62] Division of Ser. No. 493,548, Jun. 22, 1995, Pat. No. 5,616,634.

[30] Foreign Application Priority Data

Jun. 30, 1994 [DE] Germany ............... 44 22 869.4
Oct. 10, 1994 [DE] Germany ............... 44 36 094.0

[51] Int. Cl.$^6$ ............................ C08K 3/20; C08L 51/08
[52] U.S. Cl. ................... 523/423; 523/404; 523/406; 525/107; 525/119; 525/529; 528/106
[58] Field of Search ................... 523/404, 406, 523/427; 528/106; 525/107, 119, 529

[56] References Cited

U.S. PATENT DOCUMENTS

| | | | |
|---|---|---|---|
| 3,870,666 | 3/1975 | Becker | 260/21 |
| 4,315,044 | 2/1982 | Elmore et al. | 427/386 |
| 4,378,450 | 3/1983 | Ema et al. | 525/139 |
| 4,415,682 | 11/1983 | Becker | 523/403 |
| 4,423,201 | 12/1983 | Hicks | 528/76 |
| 4,446,256 | 5/1984 | Hicks | 523/402 |
| 4,837,271 | 6/1989 | Brindoepke | 523/330 |
| 4,847,337 | 7/1989 | Hefner, Jr. | 525/531 |
| 4,886,845 | 12/1989 | Becker et al. | 523/403 |
| 5,236,974 | 8/1993 | Dreischoff et al. | 523/403 |
| 5,274,012 | 12/1993 | Neffgen et al. | 523/415 |
| 5,300,618 | 4/1994 | Durairaj | 528/101 |

FOREIGN PATENT DOCUMENTS

| | | |
|---|---|---|
| 21 18 834 | 9/1994 | Canada . |
| 21 25 254 | 2/1995 | Canada . |
| 0 051 483 | 12/1982 | European Pat. Off. . |
| 0 109 173 | 7/1983 | European Pat. Off. . |
| 0 497 404 | 1/1992 | European Pat. Off. . |
| 0 639 593 | 2/1995 | European Pat. Off. . |

Primary Examiner—Melvyn I. Marquis
Assistant Examiner—D. Aylward
Attorney, Agent, or Firm—Foley & Lardner

[57] ABSTRACT

A stable, aqueous epoxy resin dispersion including: (A) an epoxy resin prepared by condensation of at least one epoxide compound having on average at least two epoxide groups per molecule, with an aralkylated polyhydroxy aromatic compound obtained by reaction of a polyhydroxy aromatic compound with an aromatic compound which carries an alkenyl group; (B) a dispersant; and water, is useful, for example, in a coating or adhesive.

26 Claims, No Drawings

STABLE, AQUEOUS EPOXY RESIN DISPERSIONS, PROCESSES FOR THEIR PREPARATION, AND THEIR USE

This application is a division of application Ser. No. 08/493,548, filed Jun. 22, 1995, U.S. Pat. No. 5,616,634.

BACKGROUND OF THE INVENTION

It is known to prepare stable, aqueous dispersions of synthetic resins by emulsifying corresponding monomers or oligomers in an aqueous medium, using appropriate dispersants, such as emulsifiers and surfactants, and then carrying out a polymerization reaction. In this way it is possible, for example, to prepare aqueous dispersions of acrylate resins by emulsion polymerization.

In the case of polycondensation products, such as epoxy resins, which are difficult or even impossible to prepare by emulsion condensation, it is necessary, however, to prepare aqueous dispersions by dispersing the resin in water. So-called secondary dispersions of this kind are generally highly unstable, separate after only a short time, and in most cases also display poor film-forming properties.

According to EP-B 0 081 163 corresponding to U.S. Pat. No. 4,415,682, polyalkylene glycol derivatives are employed as nonionic dispersants to form stable, aqueous epoxy resin dispersions. Average particle sizes of below 1 μm can be achieved. The coatings obtained with these dispersions, however, are unsatisfactory in numerous properties.

EP-A 0 051 483 corresponding to U.S. Pat. No. 4,315,044 describes epoxy resin dispersions of self-emulsifying epoxy resins which comprise polyalkylene glycol glycidyl ethers and also, if desired, a monoepoxide as reactive diluent. The maximum particle size is described as about 3 μm. Films prepared from these dispersions and suitable curing agents possess, due to the content of the relatively slow-reacting polyalkylene glycol glycidyl ethers and, if desired, monoepoxides, which act as chain terminators, a relatively soft surface which restricts the utility of the epoxy dispersions.

U.S. Pat. No. 4,423,201 describes the preparation of self-emulsifying epoxy resins from diglycidyl ethers of aromatic polyols, from aromatic polyols and from reaction products of long-chain, aliphatic polyether glycols with diisocyanates and aromatic polyols. The dispersion of these resins in water, however, is possible only with the aid of relatively large quantities of organic solvents. In addition, the particle sizes obtained are relatively high. The coatings produced using these epoxy resin dispersions, moreover, are relatively soft.

German application DE-A 41 28 487 corresponding to U.S. Pat. No. 5,236,974 describes a process for the preparation of aqueous epoxy resin dispersions which comprise, as epoxy resin, a condensation product of aromatic and aliphatic polyglycidyl compounds with aromatic polyols, and, as dispersant, a condensation product of aliphatic polyols with epoxide compounds. These dispersions exhibit excellent shear stability and storage stability and are outstandingly suitable for cold-curing coatings, especially for corrosion prevention and coating applications.

German application DE-A 43 09 639 corresponding to U.S. Pat. No. 5,424,340 describes systems of analogous composition which are intended for use in heat-curing coating systems, especially for the interior coating of tins for food.

A further development of the two latter unpublished applications is seen in the preparation of absolutely solvent-free epoxy resin dispersions by the so-called monomer process. German patent application DE-A 43 27 493 corresponding to CA 2,125,254 describes the process and the preparation of such dispersions, which are in the form of epoxide-addition polymer hybrid dispersions and have further technical advantages in comparison with pure epoxy resin dispersions, such as their freedom from solvent, higher stability of the coatings, and greater possibility of variation via the choice of the monomers.

Since the solids present in these dispersions represents physical mixtures, produced in situ, of epoxy resin and polymer, and since the choice and, in particular, the quantity of the monomers is restricted by the compatibility of the corresponding polymer with the epoxy resin, there is a need to find a manner of improving the compatibility between epoxide component and polymer component. Particularly good connection of the two components in the coating can be achieved with the abovementioned dispersions if, by appropriate choice of the functional groups of the polymer, co-crosslinking is able to take place during the curing reaction.

However, it would be desirable, by appropriate modification of the epoxy resin, for the compatibility with the addition polymer to be improved even prior to and independently of the curing reaction, thereby enabling a distinct increase in the content of relatively inexpensive polymer component.

SUMMARY OF THE INVENTION

An object of the present invention is therefore to modify an epoxy resin component in such a way that its compatibility with addition polymers comprising vinyl monomers is considerably improved.

It is also an object of the invention to provide stable, aqueous epoxy emulsions having desired particle size and being preferably substantially free of organic solvent, methods of their preparation, and methods for their use.

In accordance with these objectives, there is provided a stable, aqueous epoxy resin dispersion including (A) an epoxy resin formed by condensation of
 (A-1) at least one epoxide compound having on average at least two epoxide groups per molecule, with
 (A-2) an aralkylated polyhydroxy aromatic compound obtained by reacting
  (A-2a) a polyhydroxy aromatic compounds with
  (A-2b) an aromatic compounds which carry an alkenyl group,
(B) a dispersant and water.

In accordance with other aspects of the invention, there is provided a process for the preparation of a stable, aqueous epoxy resin dispersion which includes preparing a modified epoxy resin (A) from the epoxide compound (A1) and the aralkylated polyhydroxy aromatic compound (A2), dispersing the modified epoxy resin (A) in water with the addition of a dispersant (B) and of at least one olefinically unsaturated monomer (C1), and polymerizing (C1) by adding a radical-forming initiator.

Further objects, features, and advantages of the present invention will become apparent from the detailed description of preferred embodiments that follows.

DETAILED DESCRIPTION OF THE PREFERRED EMBODIMENTS

In accordance with the present invention, there is provided stable aqueous emulsions comprising, (A) an epoxy resin prepared by condensation
(A1) of an epoxide compound having on average at least two epoxide groups per molecule and, a preferred epoxide equivalent weight of from 100 to 2000 g/mol, or preferably a mixture of two or more such compounds, with
(A2) one or more aralkylated polyhydroxy aromatic compounds obtained by reacting
(A2a) one or more aromatic polyols (polyhydroxy aromatic compounds ) with
(A2b) one or more aromatic compounds which carry an alkenyl group,
(B) a dispersant.

The dispersant may be any desired dispersant which is effective, but is preferably
(B1) a condensation product of
(B1a) a polyol, preferably having a weight-average molecular mass ($M_w$) of from 200 to 20,000 g/mol, and
(B1b) an epoxide compound having on average at least two epoxide groups per molecule, and preferably an epoxide equivalent weight of from 100 to 2000 g/mol, and
(B2) if desired, further, preferably nonionic surfactants.

The epoxy resin dispersion of the invention may also include
(C) if desired, a diluent. While any desired diluent may be used, it is preferably selected from
(C1) olefinically unsaturated, otherwise inert or, if desired, functional monomers that are capable of undergoing free-radical polymerization or copolymerization,
(C2) low molecular weight, liquid, epoxy-functional compounds (so-called reactive diluents), and
(C3) organic solvents.

The epoxy resin dispersion also contains
(D) water; and
(E) if desired, conventional additives, curing agents, and/ or curable resins.

The term epoxide equivalent weight refers to the molecular mass divided by the number of epoxide groups per molecule.

The weight ratio of modified epoxy resin (A) to addition polymers formed from monomer (C1) (assuming (C1) is present) is generally from 99.5:0.5 to 20:80, preferably between 5:95 and 50:50. The polymer from monomer (C1) may comprise monomers whose functional groups are able to react with the intended curing agent or, at elevated temperature, with the epoxide groups, preferably in a quantity of from 2.5 to 25% based on the mass of polymer from monomer (C1).

The proportion of low molecular weight epoxide compounds (C2) can be varied as desired but, when present, is generally up to 25%, preferably 1 to 20%, based on the sum of the masses of components (A) and (C1) (if present).

The content of dispersant (B) is based on the sum of the masses of all components of the dispersion which are not soluble in water, i.e., on the epoxy resin (A), the polymer from (C1) (if present) and, if present, reactive diluents (C2), and is, an effective amount to give the dispersion effect and is generally between 1 and 25%, preferably between 2 and 15%. The ratio by mass of the components of the dispersant is in the case of (B1):(B2) generally between 0:100 and 100:0, preferably more than 75:25.

The solids content by mass of the dispersion according to the invention may be controlled as desired, and is generally between 30 and 90%, but preferably from 55 to 75%. The dispersion may contain up to 10% of solvent (C3) based on the mass of the dispersion in the supply form, but preferably is free from solvent. In this context, stable means that no sedimentation occurs in the dispersion upon storage at 20° C. for at least 3 weeks.

The invention also provides a process for the preparation of modified epoxy resin dispersions. Any desired process can be used. A particularly useful process comprises first synthesizing, if desired, the modified polyphenols (A2) as described above, then preparing epoxy resin (A) by condensation of the two components (A1) and (A2), generally at elevated temperatures in the presence of a condensation catalyst. The condensation reaction is preferably carried out in two stages if two or more epoxide compounds (A1) are used, then adding the dispersant (B) and, if desired, diluent (C) and, thereafter, adding appropriate quantities of water (D) to the resulting mixture at from, for example, 30° to 100° C. If the diluent which has been used includes monomers according to (C1), emulsion polymerization of the finished dispersion, which possibly may not yet have been diluted completely with the total quantity of water (D), is carried out in order to produce the addition polymer. Subsequently, if desired, further components according to (E) can be added.

In addition, however, it is also acceptable to react the (poly)phenols mentioned under (A2a) with a substoichiometric quantity of epoxide compounds according to (A1), and only then to modify these relatively high molecular weight products with vinyl compounds (A2b) before finally preparing the modified epoxy resin (A) using a stoichiometric excess of epoxide compounds (A1).

The invention also provides for the use of these epoxy resin dispersions for the production of, for example, coating materials, coating compositions, molding compounds, adhesives and curable compositions.

The epoxy resin (A) of the dispersions according to the invention preferably has an epoxide equivalent weight of from 350 to 4000 g/mol, in particular from 400 to 2000 g/mol. The average particle size of the dispersed resin is generally not higher than than 1.0 µm and is preferably from 0.2 to 0.8 µm. The proportion by mass of this resin in the dispersion is generally from about 20 to 75%, preferably from about 25 to 65%.

The 1,2-epoxide compounds (A1) and (B1) preferably are independently polyepoxides which on average have at least two epoxide groups per molecule. Any such epoxides or mixtures thereof are useful. These epoxide compounds may be either saturated or unsaturated and may be aliphatic, cycloaliphatic, aromatic and/or heterocyclic and may also contain hydroxyl groups. Moreover, they may comprise those substituents and/or functional groups which do not bring about any troublesome secondary reactions under the conditions of mixing or reaction, examples including alkyl or aryl substituents, ether groups, and the like.

The epoxide compounds are preferably polyglycidyl ethers based on polyhydric, preferably dihydric, alcohols, phenols, hydrogenation products of these phenols and/or based on novolaks (reaction products of mono- or polyhydric phenols with aldehydes, especially formaldehyde, in the presence of acidic catalysts). The epoxide equivalent weights of these epoxide compounds are preferably between 90 and 500 g/mol, in particular between 100 and 350 g/mol.

Examples of polyhydric phenols include resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'- dihydroxybiphenyl, 4,4'-dihydroxybenzophenone, 1,1-bis (4-hydroxyphenyl)ethane, 2,2-bis[4-(2-hydroxypropoxy) phenyl]propane, 1,1-bis(4-hydroxyphenyl)isobutane, 2,2-bis(4-hydroxy-3-tert-butylphenyl)propane, bis(2-hydroxynaphthyl)methane, 1,5-dihydroxynaphthalene, tris (4-hydroxyphenyl)methane, bis(4-hydroxyphenyl) ether, bis (4-hydroxyphenyl) sulfone and the like, and also the halogenation and hydrogenation products of the abovementioned compounds. Bisphenol A is particularly preferred in this context.

Examples of polyhydric alcohols include ethylene glycol, diethylene glycol, triethylene glycol, polyethylene glycols (degree of polymerization preferably n=1 to 35), 1,2-propylene glycol, polypropylene glycols (n=1 to 15), 1,3-propylene glycol, 1,4-butanediol, 1,5-pentanediol, 1,6-hexanediol, 1,2,6-hexanetriol, glycerol, neopentylglycol, trimethylolethane and trimethylolpropane. Polypropylene glycols (degree of polymerization n=8 to 10) are particularly preferred.

It is also acceptable to use polyglycidyl esters of polycarboxylic acids, which are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are diglycidyl adipate, diglycidyl phthalate and diglycidyl hexahydrophthalate.

A detailed listing of suitable epoxide compounds can be found in the handbook "Epoxidverbindungen und Epoxidharze" [Epoxide compounds and epoxy resins] by A. M. Paquin, Springer Verlag, Berlin 1958, chapter IV and in Lee, Neville, "Handbook of Epoxy Resins", McGraw-Hill Book Co., 1967, chapter 2. Both of these are hereby incorporated by reference in their entireties. The epoxide compounds mentioned may be employed individually or in a mixture for (A1) and (B1), and (A1) and (B1) can be the same or different.

Any polyhydroxy aromatic compounds or mixtures thereof can be used as (A2a). Examples of polyhydric (poly)phenols (A2a) include the following compounds: phloroglucinol, pyrogallol, hydroxyhydroquinone, 1,4-dihydroxynaphthalene and its positional isomers, for example, 1,2-, 1,3-, 1,5- and 1,6-dihydroxynaphthalene, 2,2'-dihydroxybiphenyl and its positional isomers, for example, 4,4'- and 2,5-dihydroxybiphenyl, 3,3'-dihydroxy-2,2'-bipyridyl, hydroquinone, resorcinol, dihydroxyanthraquinone (e.g., quinizarine, anthraflavic acid), pyrocatechol, bis(2-hydroxyphenyl)methane, bis(4-hydroxyphenyl)methane, 2,2-bis(2-hydroxyphenyl)propane, 2,2-bis(4-hydroxyphenyl)propane (bisphenol A), 4,4-bis(4-hydroxyphenyl)valeric acid and the amide thereof, bis(4-hydroxyphenyl) sulfone, bis-(4-hydroxyphenyl) sulfide, 2,2-bis(4-hydroxyphenyl)acetic acid and the amide thereof.

All of the polyhydroxy aromatic compounds mentioned for the epoxide compound (A1) are also suitable for use. The (poly)phenols mentioned may be employed individually or in a mixture. Particular preference is given to bisphenol A, bisphenol F, resorcinol, phenol, and o- or p-alkylphenol (alkyl=$C_1$-$C_{18}$).

The vinyl compounds (A2b) include any such compound, for example, styrene, α-methylstyrene, ortho-, meta- and para-methylstyrene, ortho-, meta- and para-ethylstyrene and ring-substituted mono-, di- and trihalostyrenes such as p-bromostyrene, p-chlorostyrene, 2,4-dibromostyrene, 2,4-dichlorostyrene and 2,4,6-trichlorostyrene.

Also useful but less preferred are vinyl esters (for example, of Versatic® acid(s): Veova® 10, Veova® 9, Veova® 5, from Shell; vinyl acetate, vinyl propionate, vinyl 2-ethylhexanoate) and vinyl ethers (for example, of methanol, ethanol, propanol, isobutanol, octadecanol, tert-butanol, cyclohexanol, and the mono- and divinyl ethers of ethylene glycol, 1,2-propanediol and 1,3-propanediol, 1,4-butanediol, 1,6-hexanediol, tetraethylene glycol, Pluriol®-E-200, polytetrahydrofurandiol, 2-diethylaminoethanol and aminopropanol, it being possible for the amino group to be present in blocked form, if desired, as ketimine).

Other suitable but less preferred vinyl compounds include esters of acrylic or methacrylic acid with monoalcohols containing 1 to 18 carbon atoms, for example, t- or n-butyl methacrylate, methyl methacrylate, isobutyl acrylate, 2-ethylhexyl acrylate or t- or n-butyl acrylate, hydroxy-$C_{2-4}$-alkyl acrylates, hydroxyethyl (meth)acrylate and/or hydroxypropyl (meth)acrylate and further compounds mentioned below under (C1).

Furthermore, it is also possible to employ reaction products of (mono)hydroxy-functional vinyl ethers or esters or (meth)acrylates (see above) with diisocyanates (cf. EP-A 0 296 507 incorporated by reference herein), and (bis)phenols urethane-modified in this way.

Particular preference for (A-2) is given to reaction products of (poly)phenol and vinyl compound which contain, on average, from 1.5 to 3 phenolic OH groups per molecule.

The polyols (B1a) include any desired polyols, but are preferably polyetherpolyols (polyoxyalkylene glycols) having weight-average molar masses ($M_w$; gel permeation chromatography, polystyrene standard) of preferably between 600 and 12,000 g/mol, in particular from 2000 to 8000 g/mol and OH numbers which are advantageously from 10 to 600, preferably from 15 to 120, mg of KOH/g. These polyetherpolyols preferably possess only terminal, primary OH groups. Examples in this context are block copolymers of ethylene oxide and propylene oxide, and polyethylene, polypropylene and polybutylene glycols, it also being possible to employ mixtures of the respective polyalkylene glycols. Polyethylene glycols are preferably used.

Suitable epoxide compounds (B1b) include any in the art as well as all of the compounds mentioned above under (A1).

The dispersant (B1) is preferably prepared by condensation of the abovementioned polyetherpolyols (B1a) with the polyglycidyl ethers (B1b) in the presence of suitable catalysts at, for example, from 50° to 200° C., preferably from 90° to 170° C., with the ratio of the number of OH groups to that of the epoxide groups generally being from 1:0.8 to 1:1.5, preferably from 1:0.95 to 1:1.25, and the epoxide equivalent weight of the condensation product being at least 5000 g/mol, preferably from 100,000 g/mol to 400,000 g/mol. In this way it is possible, for example, to react hydrophobic epoxide compounds (e.g., polyethylene glycol diglycidyl ether) with hydrophobic polyols (e.g., bisphenol A) or, preferably and conversely, hydrophobic epoxide compounds (e.g., bisphenol A diglycidyl ether) with hydrophilic polyols (e.g., polyethylene glycol). Products of this kind are described in DE-C 36 43 751 and DE-A 41 28 487 corresponding to U.S. Pat. No. 5,236,974, both which are hereby incorporated by reference.

Suitable catalysts for this condensation reaction include strong inorganic and organic bases, for example, sodium hydroxide, potassium hydroxide, lithium hydroxide, barium hydroxide, strontium hydroxide, alkali metal alcoholates such as sodium methylate, lithium methylate, sodium ethylate and potassium dodecylate, and the alkali metal salts of carboxylic acids, for example, sodium stearate and lithium stearate. Also suitable are strong inorganic and organic Brönsted acids, for example, phosphoric acid, tetrafluoroboric acid and toluene- or benzenesulfonic acid. Lewis acids can also be used as catalysts. Examples include tin tetrachloride, titanium tetrachloride, titanium tetraisopropylate, triethyloxonium tetrafluoroborate, and also boron trifluoride and its complexes, for example, with phosphoric acid, acetic acid (1:1 and 1:2), methanol, diethyl ether, tetrahydrofuran, phenol, ethylene glycol monoethyl ether, polyethylene glycol (for example, of molar mass 200 g/mol), dimethyl sulfoxide, di-n-butyl ether, di-n-hexyl ether, succinic acid and aliphatic, cycloaliphatic and araliphatic amines, and also nitrogen-containing heterocycles.

As catalysts it is preferred to employ $BF_3$-diethyl etherate, $BF_3$-acetic acid adduct and aqueous tetrafluoroboric acid. The quantity of catalyst is generally from 0.1 to 5%, preferably from 0.1 to 1%, based on the mass of the reaction mixture. To facilitate its addition, the catalyst may be diluted in a solvent such as diethyl ether, a glycol ether or cyclic ether, ketones and the like.

In order to prepare the condensation product (B1) the mixtures to be reacted, comprising compounds containing hydroxyl groups and compounds containing epoxide groups, are heated to the temperature at which the condensation takes place at a sufficient rate, i.e., in from 30 minutes to 5 hours. The reaction is advantageously monitored by way of the increase in the epoxide equivalent weight, which indicates a reduction in the number of epoxide groups. The reaction can be terminated by cooling to below the reaction temperature.

The condensation product (B1) obtained in this way can be used as such (100% strength) as dispersant (B) for the preparation of the dispersions according to the invention. Preferably, however, for reasons of better handling, a mixture is prepared of from 20 to 99%, preferably from 40 to 60%, of the condensation product (B1) and an aqueous medium consisting of (based on the overall mixture) up to 50%, preferably from 1 up to 30%, of an organic solvent (C3) and from 1 to 80%, preferably from 15 to 60%, of water (D), and this mixture is used as dispersant.

Any desired solvent (C3) can be used. (C3) is optional and preferably is not present. Thus, a solvent-free dispersion can be produced. Particularly suitable organic solvents in accordance with component (C3) include glycols, mono- and diethers and mono and diesters of glycols with alcohols and acids, aliphatic alcohols with linear or branched alkyl radicals of 1 to 12 carbon atoms, cycloaliphatic and araliphatic alcohols, and also esters and ketones, it being possible to employ these solvents individually or in a mixture. Examples of solvents which may be mentioned include: ethylene glycol, ethylene glycol monomethyl ether, ethylene glycol dimethyl ether, butylglycol, methoxypropanol, ethoxypropanol, ethanol, 1- and 2-propanol, butanol, cyclohexanol, benzyl alcohol, ethyl acetate, acetone and also methyl isobutyl ketone. Preference is given to employing butylglycol, methoxypropanol, ethoxypropanol, 2-propanol and/or benzyl alcohol.

In addition to the dispersant (B1) it is also possible to use other dispersants (B2) of the anionic, cationic and—preferably—nonionic type. Any known surfactants can be used. Suitable anionic surfactants include alkylbenzenesulfonates, primary and secondary alkanesulfonates, $\alpha$-olefinsulfonates, alkyl sulfates and alkyl ether sulfates, and suitable cationic surfactants include quaternary ammonium compounds, and in this context the ionic groups must not interact with the epoxide groups. It is preferred, however, to use nonionic surfactants such as ethoxylated or eth/propoxylated alcohols, oxo alcohols, alkylphenols (e.g., Arcopal® from Hoechst), castor oils, esters, glycerol stearates, fatty acids, fatty amines, fatty alcohols, or else, for example, ethylene oxide-propylene oxide block copolymers (e.g., Pluronic® from BASF).

The emulsifiers which are specifically described for the dispersion of epoxy resins can also be employed, for example, those described in U.S. Pat. No. 4,423,201 and U.S. Pat. No. 4,446,256 (products of polyalkylene glycols, diisocyanates and bisphenols), EP-A 0 497 404 (products of alkoxypolyalkylene glycols, anhydrides and alkylene oxides, epoxy alcohols or diglycidyl ethers), WO 91/10695 corresponding to CA 2,072,076 (products of polyglycidyl ethers, bifunctional compounds and alkoxypolyalkylene glycols), EP-A 0 109 173 corresponding to U.S. Pat. No. 4,421,906 (products of polyoxyalkylenepolyamines and epoxy resins) and DE-A 41 36 943 (products of polyalkylene glycols with diisocyanates and polyepoxides).

The optional diluent (C) may be composed of monomers (C1) which are capable of undergoing polymerization, low molecular weight, liquid epoxide compounds—so-called reactive diluents—(C2), and/or organic solvents (C3).

Suitable monomers (C1) include all ethylenically unsaturated compounds which are capable of undergoing free-radical polymerization in emulsion and do not give rise to unwanted interaction with the existing epoxy resin dispersion at room temperature. Such monomers include acrylic, methacrylic and higher alkylacrylic acids, and the alkyl esters thereof ($C_1$- to $C_{18}$-alkyl (meth)acrylates, for example, methyl acrylate and methacrylate, ethyl acrylate and methacrylate, n- and isopropyl acrylate and methacrylate, n-, iso- and tert-butyl acrylate, n- and tert-butyl methacrylate, 2-ethylhexyl acrylate and methacrylate, 4-tert-butylcyclohexyl acrylate, isobornyl acrylate and methacrylate) and derivatives (e.g., acrylonitrile), but also vinyl derivatives (e.g., styrene, $\alpha$-methylstyrene, vinyltoluenes, vinyl acetate, vinyl chloride, vinylidene chloride, N-vinylpyrrolidone) and $\alpha,\beta$-unsaturated carboxylic acids such as maleic acid, fumaric acid, itaconic acid and derivatives thereof, and also alkenes such as isoprene and butadiene.

The monomers may also contain functional groups which participate in the curing reaction of the epoxy resin which is desired later. Examples of suitable monomers include glycidyl- and hydroxyl-functional monomers (e.g., glycidyl methacrylate, 2-hydroxybutyl acrylate, 4-hydroxybutyl acrylate, 2-hydroxyethyl acrylate, 2-hydroxyethyl methacrylate, 2-hydroxypropyl acrylate, hydroxypropyl methacrylate, and the like). Also, amido-functional compounds (e.g., acrylamide) or N-methylol monomers (e.g., N-methylolacrylamide) may be used. Finally, polyfunctional monomers, whether with respect to the polymerization or the curing process, may also be present, examples being 1,6-hexanediol diacrylate and divinylbenzene.

The monomers (C1) may be added as the total quantity all at once prior to the dispersion in water, and thus act to reduce the viscosity and facilitate the dispersion operation, or, given a relatively high proportion of polymer, a portion thereof can be present during the dispersion operation while the remainder is metered in continuously during the emulsion polymerization of (C1). In this way core-shell particles can be produced in a targeted manner. The presence of the monomers during dispersion has the advantage that the viscosity maximum in the course of the phase inversion W/O→O/W (water-in-oil to oil-in-water) need not be reduced by inert solvents which remain in the finished dispersion, as was described in EP-A 0 272 595 corresponding to U.S. Pat. No. 4,886,845. Thus it is possible to formulate completely solvent-free dispersions—a further considerable improvement on the prior art. However, an excessive monomer content during the dispersion operation may reduce the viscosity too much, and the shear force to be applied for the dispersion operations would no longer be able to be developed. For this reason, if appropriate, it is desirable to divide the quantity of monomers into two or more appropriate portions.

If it is intended to co-crosslink the polymer in the course of the curing reaction, then functional co-monomers should be employed in (C1). Preferred monomers for cold-curing systems (amine curing agents) are those containing glycidyl groups (e.g., glycidyl methacrylate); preferred monomers for heat-curing systems are those containing acid groups (for example, methacrylic acid, which reacts on baking with the epoxide groups of (A) and, if present, (C2)), or OH-functional monomers (for example, hydroxyethyl methacrylate, which reacts on baking with methylol or acid groups of the curing agent).

Low molecular weight, liquid, epoxy-functional compounds (C2) which are useful include mono- and diglycidyl ethers, which are known inter alia by the term reactive diluents, examples being para-tert-butylphenyl glycidyl ether, n-butyl glycidyl ether, phenyl glycidyl ether, orthocresyl glycidyl ether, butanediol diglycidyl ether, hexanediol diglycidyl ether, neopentylglycol diglycidyl ether, dimethylolcyclohexane diglycidyl ether, 2-ethylhexyl glycidyl ether, higher alkyl glycidyl ethers, and the like (e.g., the reactive diluents of the series Grilonit® RV from Ems, Epodil® from Anchor or Eurepox® RV from Schering), Versatic® acid glycidyl esters (Cardura® E 10 from Shell), liquid polyoxyalkylene diglycidyl ethers (e.g., Beckopox® EP 075 from Hoechst), and also liquid epoxy resins such as, for example, diglycidyl ethers of bisphenol A and of bisphenol F. Component (C2) is referred to below for reasons of simplicity as reactive diluent. Preferred reactive diluents are hexanediol diglycidyl ether and para-tert-butylphenyl glycidyl ether. The molar mass of these compounds is generally below 800 g/mol.

In addition to the solvents mentioned above for (B), suitable organic solvents (C3) also include aromatic compounds such as toluene or xylene. The solvents may be employed individually or in mixture. Preferred solvents are once again butylglycol, methoxypropanol, ethoxypropanol, 2-propanol and/or benzyl alcohol.

As conventional additives (E), which may optionally be present in the combinations according to the invention, mention is made, for example, of the conventional coatings additives, such as pigments, pigment pastes, antioxidants, leveling agents, thickeners, antifoams and/or wetting agents, reactive diluents, fillers, catalysts, preservatives and protective colloids. These additives, like the further curable resins and the curing agents which are described later on, can be added to the dispersion, if desired, not until directly prior to processing.

The invention also provides a process for the preparation of the epoxy resin dispersions according to the invention. In this process the epoxy resin (A) can be prepared by condensation of components (A1) and (A2) at elevated temperatures, in general from 100° to 220° C., preferably from 150° to 180° C., in the presence of a catalyst which accelerates the condensation.

If two or more epoxide compounds (A1) are employed, then the condensation reaction is preferably carried out in two stages such that, in a first reaction, one or more components (A1) are reacted with the components according to (A2) in a proportion such that this first condensation product has an epoxide equivalent weight of more than 5000 g/mol, preferably more than 20,000 g/mol, and still contains free phenolic groups, and, in a further condensation reaction, this first condensation product is reacted with further epoxide compounds according to (A1), so that finally the desired epoxy resin (A) is obtained.

Examples of suitable condensation catalysts include phosphines such as triphenylphosphine, phosphonium salts such as benzyltrimethylphosphonium chloride, tertiary amines such as N,N-dimethylbenzylamine, quaternary ammonium salts such as tetramethylammonium chloride, alkali metal hydroxides such as sodium hydroxide and lithium hydroxide, alkali metal carbonates such as sodium carbonate and lithium carbonate, alkali metal salts of organic acids, for example, sodium formate, lithium benzoate and lithium stearate, and Lewis acids, for example, boron trifluoride and its complexes, titanium tetrachloride, tin chloride and triethyloxonium tetrafluoroborate.

Subsequently, the dispersant (B) and, if desired, diluents according to (C) are added to the epoxy resin (A) at temperatures of, for example, from 60° to 200° C., preferably from 70° to 120° C., and the mixture is stirred, for example, from 15 to 180 minutes, preferably from 30 to 90 minutes.

Thereafter, the appropriate quantity of water (D) is metered in with vigorous stirring, preferably in two or more portions, at temperatures of, for example, from 30° to 100° C., preferably from 50° to 90° C., thereby producing the aqueous dispersion.

The diluent (C) which may be used is generally added as the total amount all at once prior to the dispersion in water, and thus acts to reduce the viscosity and facilitate the dispersion operation, or, in the case of a relatively large amount, it may be present in part during the dispersion operation, and the remainder is added once dispersion has been carried out. In this context it is not necessary for the two portions to be identical in terms of the nature and composition of components (C1), (C2) and (C3). The presence of the diluent (C1) and/or (C2) during the dispersion has the effect that the viscosity maximum in the phase inversion W/O→O/W need not be reduced by inert solvents which remain in the finished dispersion, as was described in DE-A 41 28 487 corresponding to U.S. Pat. No. 5,236,974. It is therefore possible, without solvents according to (C3), to formulate completely solvent-free dispersions—a further considerable improvement on the prior art. However, an excessive content during the dispersion operation would reduce the viscosity too much, and it would no longer be possible to build up the shear force to be applied for the dispersion operations. It may therefore be necessary to divide the total amount into two appropriate portions.

Reactive diluent (C2) can be used, moreover, in order to control the applications-related properties of the dispersion, for example, reduction of the minimum film-forming temperature, extension of the pot life, improvement in gloss, shear stability and stability to freeze-thaw cycles, specific influencing of hardness and elasticity, etc. The advantage over the use of organic solvents is that these reactive diluents are incorporated into the film during the curing reaction and thus do not lead to the unwanted emission of organic components; the claim to freedom from solvent thus remains intact. The addition of the reactive diluent prior to the dispersion process has the substantial advantage that this diluent is emulsified markedly better and with less effort than in the case of subsequent addition to the finished dispersion, thereby leading to an improvement in the quality of the coating. In this case, reactive diluent and base resin are probably present in conjoint micelles, a state which subsequent incorporation and homogenization of the reactive diluents is unable to achieve. The content of reactive diluent should be added on to the solids content of the binder and/or the coating material.

In a preferred process, when epoxide-polyacrylate dispersions are prepared, at temperatures of from 60° to 200° C., preferably from 70° to 120° C., to the epoxy resin (A) are added the monomers (C1)—stabilized if appropriate with suitable inhibitors known to those skilled in the art—and, if desired, reactive diluent (C2) or an appropriate portion, then the dispersants (B1) and, if desired, (B2), followed if desired by organic solvent (C3), and the mixture is stirred for from 15 to 180 minutes, preferably from 30 to 90 minutes. As an alternative the addition of the monomers can be followed by carrying out a reaction between epoxy resin and the monomers, for example, the addition of carboxyl or amine monomers onto the epoxide groups or grafting onto aliphatic carbon atoms of the epoxide components (A) and (C2), before the dispersant is added.

Subsequently, at temperatures of from 30° to 100° C., preferably from 50° to 90° C., the appropriate quantity of water (D) is metered in with vigorous stirring, preferably in two or more portions, to form the aqueous dispersion. At this point, suitable antifoam/deaeration additives may be added if desired. The dispersion operation is advantageously carried out with the aid of suitable dispersing equipment, for example, a high-speed paddle stirrer, a multiple-impulse helical stirrer, a colloid mill, a homogenizer, a dissolver or any other rapid mixer having a high shear force. This operation is described in great detail in DE-A 41 28 487 corresponding to U.S. Pat. No. 5,236,974 the disclosure of which is incorporated by reference herein.

This process yields an epoxy resin dispersion which comprises monomers and reactive diluent, in which emulsion polymerization is initiated at an appropriate temperature. In the case of redox initiators, the oxidizing agent is preferably incorporated by homogenization together with the water of dilution, and the reducing agent is metered in continuously; however, all conceivable variants are likewise in accordance with the invention. If the quantity of monomer is greater than that required for the dispersion, then the remaining quantity of the monomers (C1) is also metered in at this stage, with the targeted preparation of core-shell acrylate particles being possible here with the aim of controlling the properties of the dispersion in a desired manner. The preferred temperature range for the emulsion polymerization is from 60° to 90° C., and the reaction is monitored by determining the solids content or by gas chromatography. Any unwanted increase in viscosity can be compensated by the subsequent metered addition of water.

The emulsion polymerization can be initiated at a temperature which guarantees rapid and complete reaction and, at the same time, does not pose a threat to the dispersion. Suitable radical-forming initiators for this reaction are heat-activatable free-radical initiators or redox systems, all of which are well known to those skilled in the art. It is also possible, preferably, to employ mixtures of two or more initiators.

Thermal initiators include peroxides, hydroperoxides, per-esters and diazo compounds, examples being dibenzoyl peroxide, acetyl peroxide, benzoyl hydroperoxide, tert-butyl hydroperoxide, di-tert-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-tert-butyl peroxide, butyl-tert-butyl peroxide, dilauroyl peroxide, difuroyl peroxide, ditriphenylmethyl peroxide, bis(p-methoxybenzoyl) peroxide, p-monomethoxybenzoyl peroxide, rubrene peroxide, ascaridole peroxide, tert-butyl peroxybenzoate, diethyl peroxyterephthalate, propyl hydroperoxide, isopropyl hydroperoxide, n-butyl hydroperoxide, tert-butyl hydroperoxide, cyclohexyl hydroperoxide, trans-decalin hydroperoxide, α-methylbenzyl hydroperoxide, α-methyl-α-ethylbenzyl hydroperoxide, tetralin hydroperoxide, triphenylmethyl hydroperoxide, diphenylmethyl hydroperoxide, 2,5-dimethyl-2,5-bis(2-ethylhexanoylperoxy)hexane, 1,1-bis(tert-butylperoxy)cyclohexane and tert-butyl perbenzoate.

Redox systems may be selected from oxidants such as, for example, hydrogen peroxide, tert-butyl hydroperoxide or persulfates, in combination with reducing agents such as alpha-hydroxy ketones, ascorbic acid, hydrazine and sulfites, bisulfites, metasulfites or hydrosulfites.

Preferably, the initiators employed should be those which generate few or no ionic compounds, so as not unnecessarily to increase the sensitivity to water of the subsequently baked films. If desired, acceleration can be brought about by employing the salts of transition metals which are known for this purpose. A particularly preferred system is tert-butyl hydroperoxide/ascorbic acid.

The epoxy resin dispersions according to the invention are distinguished on the one hand by their good storage stability, which is to be attributed to the low—for secondary dispersions—average particle size, and on the other hand, in particular, by their very low or zero content of organic solvents.

The viscosity of these dispersions is in general between 200 and 30,000 mPa·s, preferably between 750 and 7000 mPa·s.

The curing agents and further curable resins according to (E) which may be used, are preferably not added until directly before the use of the dispersion. For the modified epoxy resins of the invention, any of the curing agents and/or curing compounds (epoxide hardeners) which are known for this purpose can be employed, such as basic curing agents (amine hardeners), for example, polyamines, Mannich bases, adducts of amines with polymers, such as polyepoxides and polyamidoamines.

In addition, acidic curing agents (acid hardeners) such as polycarboxylic acids and their anhydrides, and polyhydric phenols, can be used. Synthetic resins containing hydroxyl and/or amino groups, such as amine or phenolic resins, are also suitable for this purpose.

The epoxy resin dispersions according to the invention can also be cured by means of so-called latent curing agents, i.e., compounds which develop their cross-linking action with regard to epoxide compounds only at relatively high temperatures, for example, at from 60° to 250° C. Examples of such curing agents are urea, dicyandiamide, imidazole, guanidine, hydrazide and derivatives of the compounds mentioned. Among these latent curing agents, preference is given to the use of dicyandiamide.

Examples of basic curing agents, preferably for curing at room temperature and/or relatively low temperatures (amine cold hardeners), which are generally employed in a ratio of the number of epoxide groups to the number of amine hydrogen atoms of 1:(0.75 to 2.0), are polyalkyleneamines, such as diethylenetriamine, triethylenetetramine, tetraethylenepentamine, pentaethylenehexamine, and also 2,2,4- and/or 2,4,4-trimethylhexamethylenediamine, bis(3-aminopropyl)amine, 1,4-bis(3-aminopropyl)piperazine, N,N-bis(3-aminopropyl)ethylenediamine, neopentanediamine, 2-methyl-1,5-pentanediamine, 1,3-diaminopentane, hexamethylenediamine, and cycloaliphatic amines such as 1,2- and/or 1,3-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophoronediamine and reaction products thereof, 4,4'-diaminodicyclohexylmethane and -propane, 2,2-bis(4-aminocyclohexyl)methane and -propane, 3,3'-dimethyl-4,4'-diaminodicyclohexylmethane, 3-amino-1-cyclohexylaminopropane, 1,3- and 1,4-bis(aminomethyl)-cyclohexane.

As araliphatic amines, use is made in particular of those which contain aliphatic amino groups, for example, meta- and para-xylylenediamine or hydrogenation products thereof.

The amines mentioned may be used alone or as mixtures.

Suitable Mannich bases are prepared by the condensation of polyamines, preferably diethylenetriamine, triethylenetetramine, isophoronediamine, 2,2,4- and/or 2,4,4-trimethylhexamethylenediamine, 1,3- and 1,4-bis-(aminomethyl)cyclohexane, especially meta- and paraxylylenediamine, with aldehydes, preferably formaldehyde, and mono- or polyhydric phenols having at least one ring position which is reactive with respect to aldehydes, examples being the various cresols and xylenols, para-tert-butylphenol, resorcinol, 4,4'-dihydroxydiphenylmethane and 4,4'-dihydroxydiphenyl-2,2-propane, but preferably phenol.

Examples of suitable amine-epoxide adducts are reaction products of polyamines, for example, ethylenediamine, propylenediamine, hexamethylenediamine, 2,2,4- and/or 2,4,4-trimethylhexamethylenediamine, metaxylylenediamine and/or bis(aminomethyl)cyclohexane with terminal mono- or polyepoxides, for example, propylene oxide, hexene oxide, or cyclohexene oxide, or with glycidyl ethers such as phenyl glycidyl ether, tert-butyl glycidyl ether, ethylhexyl glycidyl ether, butyl glycidyl ether or with glycidyl esters, such as the glycidyl ester of Versatic® acid marketed by Shell, Cardura® E, or the polyglycidyl ethers and polyglycidyl esters mentioned under (A1) and/or (B1b).

Polyamidoamines which can be used to cure the epoxy resin dispersions according to the invention are obtained, for example, by reacting polyamines with mono- or polycarboxylic acids, for example, dimerized fatty acids.

As amine curing agents, in addition to the abovementioned polyamines it is preferred to employ water-soluble polyoxyalkylenedi- and -polyamines having molar masses of from 100 to 2000 g/mol, for example, the products marketed by Texaco under the trade name Jeffamine®, and the readily water-dispersible curing agents as described in DE-A 23 32 177 corresponding to U.S. Pat. No. 3,870,666 and EP-B 0 000 605, in other words modified amine adducts, for example.

In order to obtain more rapid and/or more complete through-curing it is also possible to heat the coatings which are obtainable from the epoxy resin dispersions according to the invention, using the amine curing agents mentioned, at from 50° to 120° C. for from 15 to 120 minutes.

As acidic curing agents, which are generally employed in a ratio of the number of epoxide groups to the number of carboxyl groups of from 1:(0.75 to 2), water-soluble or water-miscible polycarboxylic acids are suitable. Examples of such polycarboxylic acids include cyclopentanetetracarboxylic acid, cyclobutanetetracarboxylic acid, 1,2,3,4-butanetetracarboxylic acid, tartaric acid, malonic acid, malic acid, citric acid and aconitic acid.

Further suitable compounds, if desired, are anhydrides or acidic esters of these acids with polyhydric alcohols of from 2 to 12, preferably of from 2 to 6, carbon atoms, such as neopentylglycol, glycerol, trimethylolethane or trimethylolpropane, the alkanediols and oligomers thereof which may contain one or more ether bridges, such as ethylene glycol, propane- and butanediols, with the esters always containing at least two free carboxyl groups. It is also possible for the polycarboxylic acid curing agents used to be acidic esters, having two or more carboxyl groups, of carboxylic acids, for example, pyromellitic acid, trimellitic acid, phthalic acid, endomethylenetetra- or -hexahydrophthalic acid, maleic acid, fumaric acid and their anhydrides, where they exist, with polyhydric alcohols, for example, those mentioned above, provided these acidic esters possess an adequate solubility or dilutability in water. As acidic curing agents it is preferred to employ polycarboxylic acids.

The curing of the epoxy resin dispersions with the acidic curing agents mentioned is advantageously carried out at relatively high temperatures, for example, at from 60° to 220° C., preferably from 80° to 200° C., in from 15 to 50 minutes. In order to attain more complete through-curing or to reduce the temperatures necessary for sufficient through-curing, it is also possible to add to the abovementioned acid curing agents small quantities of compounds which catalyze the reaction between carboxyl group and epoxide group. Examples of suitable compounds are strong protonic acids such as phosphoric acid or para-toluenesulfonic acid, tertiary amines such as triethylamine, N,N-dimethylbenzylamine, nitrogen-containing heterocycles such as imidazole, pyridine and derivatives thereof, trialkyl- and triarylphosphines and appropriate phosphonium compounds, and metal salts and/or metal chelates, for example, tin(II) octoate.

Instead of or in addition to the above-described curing agents it is also possible to use amine and/or phenolic resins for curing, which are employed in quantities of, for example, from 5 to 50%, preferably from 10 to 35%, based on the overall mass of the solids. If desired, the dispersion is in this context further adjusted to an overall solids content of from 10 to 80% by adding an additional quantity of water. Examples of such amine resins are amine-aldehyde resins, i.e., condensation products of aldehydes with melamine (melamine resins), urea (urea resins), acetoguanamine (acetoguanamine resins) or similar compounds and/or corresponding precondensation products. Preferred aldehyde condensation products of melamine are, in particular, the alkoxymethylmelamine derivatives in which the alkyl radicals are methyl, n-butyl or isobutyl groups, preferably methyl groups, such as hexamethoxymethylmelamine, ethoxymethoxymethylmelamine, monomethylolpentamethoxymethylmelamine, dimethyloltetramethoxymethylmelamine, trimethyloltrimethoxymethylmelamine and the like, having a largely monomeric structure, and corresponding oligomeric or polymeric products.

Phenolic resin curing agents which may be mentioned are resols, formaldehyde-phenolcarboxylic acid resins and phenolic resin precursors, preference being given to the commercially available, etherified, water-dilutable phenolic resin resols.

If desired, the dispersions containing phenolic and/or amine resin can also have added to them acidic catalysts, such as para-toluenesulfonic acid, cyclohexanesulfamic acid, acid butyl phosphate and phosphoric acid—if desired also as (amine) salts—in order to accelerate the rate of the curing reaction, so as to give films or coatings which cure at low temperature or in a relatively short time. The quantity of these acidic catalysts can be, for example, 2% based on the overall mass of solids.

Additional, curable resins useful as optional component (E) are, for example, resins which are dispersible in aqueous media and are based on hydroxyalkyl acrylic esters, hydroxy alkyds, polyesters, epoxy resins and the like. The proportion of these additives may be such, for example, that the overall solids content by mass of the mixture is from about 10 to 80%, preferably from 20 to 40%. The addition of such resins enables the properties of the products produced from the dispersions to be influenced in a great diversity of ways. Thus, for example, it is possible to use the addition of acrylate resins to increase the yellowing resistance, whereas when alkyd resins are present there is a significant improvement in the elasticity of the coatings prepared therefrom.

Compared with those epoxy resin dispersions which are already known, the coatings which are obtainable using the dispersions according to the invention additionally possess a range of technical advantages, for example, very low sensitivity to water, very good elasticity coupled with improved hardness, good to very good adhesion to a wide variety of substrates, and outstanding corrosion prevention in the coating of metallic materials.

On the basis of their outstanding technical properties which have already been discussed, for example, in respect of adhesion, hardness, corrosion prevention, and resistance to water and chemicals, the dispersions according to the invention are suitable, in combination with appropriate curing agents and additives, for the production of coatings, intermediate coatings, coating materials, molding compositions and curable compositions for a very wide range of applications. For example, they can be used for the production of protective and/or decorative coatings on a very great variety of substrates, including in particular rough and porous substrates, for example, wood, mineral substrates (e.g., concrete and masonry), glass, plastics (e.g., polyethylene, polypropylene), composite materials, ceramics and pretreated or nonpretreated metals.

On the basis of their good properties the dispersions according to the invention are also outstandingly suitable for single-layer coating. The adhering coating layer can remain unchanged as it is, or else it can be used as an intermediate layer, i.e., a substrate for further coatings, which may in turn consist of the same coating material or a different, conventional coating material.

Because of their ready dilutability and their favorable properties, the dispersions according to the invention are also suitable for additional use in electrodeposition coating.

A further possible application of the dispersions according to the invention is their use for the production of water-dilutable adhesives. They can also be employed as binders for textile, organic and/or inorganic materials.

In addition, they may serve as an additive to plastic cements.

When used as coating compositions or as predominantly aqueous coating materials, application to the substrate is by any desired conventional method such as, for example, by brushing, spraying, dipping or rolling. Where no curing agents are used for the cold curing, the coatings are cured by heating at from 80° to 250° C. for a time which is sufficient to effect complete curing, in general from 5 to 60 minutes.

A significant advantage is to be seen in the considerably improved compatibility with high-styrene polyacrylates which, moreover, may be present in relatively large quantities in the overall system owing to the use of "styrenized resins".

The invention is further described with reference to the following examples. The examples are for illustrative purposes only and do not further limit the invention.

EXAMPLES

1. Preparation of modified epoxy resin dispersions
Synthesis of the base resin modified in accordance with the invention 60 g of a diglycidyl ether of polypropylene glycol 600 (A1) are reacted with 136 g of a reaction product A-2 of 1 mol of bisphenol A (A2a) with 2 mol of styrene (A2b) (OH equivalent weight about 220 g/mol) in the presence of 0.3 g of Shell® catalyst 1201 (triphenylethylphosphonium iodide) at 160° C. until the epoxide equivalent weight is greater than 15,000 g/mol. The reaction mixture is cooled to 100° C. and then 254 g of diglycidyl ether of bisphenol A (A1, epoxide equivalent weight about 185 g/mol) and 0.1 g of Shell® catalyst 1201 are added, and reaction is carried out at 160° C. up to an epoxide equivalent weight of about 480 g/mol.

1.1 Dispersion according to the invention for cold-curing systems according to DE-A 41 28 487 corresponding to U.S. Pat. No. 5,236,974, which is hereby incorporated by reference.

Modified base resin, containing solvent 50 g of methoxypropanol (C3) are added at 100° C. to the base resin according to the invention, followed by 100 g of a 50% strength solution of an emulsifier B1 in water/2-propanol (C3) (1:1), as described in DE-A 36 43 751, hereby incorporated by reference. The resin is then dispersed with 310 g of water D by the method described in DE-A 41 28 487 corresponding to U.S. Pat. No. 5,236,974.

A storage-stable dispersion is obtained which has the following characteristics:

| | |
|---|---|
| viscosity (25° C., Brookfield) | 913 mPa · s |
| residue (1 h, 1 g, 125° C.) | 54.5% |
| epoxide equivalent weight (supply form) | 1013 g/mol |
| particle size (monomodal) | 820 nm |
| emulsifier content | 10% based on solids |
| solvent content | 10% based on solids |

1.2 Comparison dispersion according to DE-A 43 27 493 corresponding to CA 2,125,254
Non-modified base resin, free of solvent A base resin is prepared as in accordance with Example 1 but using the corresponding quantity of non-styrenized bisphenol A. To 385 g of this resin are added 138 g of a 50% strength solution of an emulsifier B1 in water, as described in DE-A 36 43 751 corresponding to U.S. Pat. No. 4,886, 845, and 43 g of styrene C1. The mixture is then dispersed with 320 g of water D by the method described in DE-A 41 28 487 corresponding to U.S. Pat. No. 5,236,974. Following this, polymerization is carried out at 75° C. by the method described in DE-A 43 27 493 corresponding to CA 2,125, 254 hereby incorporated by reference (see also Example 2.2).

A storage-stable dispersion is obtained which has the following characteristics:

| | |
|---|---|
| viscosity (25° C., Brookfield) | 1480 mPa · s |
| residue (1 h, 1 g, 125° C.) | 56.0% |
| epoxide equivalent weight (supply form) | 1078 g/mol |
| particle size (monomodal) | 338 nm |
| emulsifier content | 8% based on solids |
| solvent content | 0% |

1.3 Dispersion according to the invention according to DE-A 43 27 493.5 corresponding to CA 2,125,254

Modified base resin, free of solvent

To 385 g of the base resin according to the invention are added 138 g of a 50% strength solution of an emulsifier B1 in water, as described in DE-A 36 43 751 corresponding to U.S. Pat. No. 4,886,845, and 43 g of styrene (C1). The mixture is then dispersed with 320 g of water D by the method described in DE-A 41 28 487 corresponding to U.S. Pat. No. 5,236,974. Following this, polymerization is carried out at 75° C. by the method described in DE-A 43 27 493 corresponding to CA 2,125,254 (see also Example 2.2).

A storage-stable dispersion is obtained which has the following characteristics:

| | |
|---|---|
| viscosity (25° C., Brookfield) | 1810 mPa · s |
| residue (1 h, 1 g, 125° C.) | 55.8% |
| epoxide equivalent weight (supply form) | 1213 g/mol |
| particle size (monomodal) | 425 nm |
| emulsifier content | 8% based on solids |
| solvent content | 0% |

Applications-related properties

The dispersion 1.1 to 1.3 are mixed with an equivalent of the curing agent Beckopox® EH 623w (Hoechst, an aqueous solution of modified aliphatic polyamine, 80% strength) diluted with water to 40% and are drawn onto degreased glass plates, dry film thickness 25 μm. Curing is carried out at 26° C./40% relative atmospheric humidity.

As a commercial comparison system, the aqueous dispersion Beckopox® VEP 2385w (Hoechst, an aqueous dispersion of flexibilized epoxy resin, mass fraction of epoxy resin 56%, mass fraction of water 42%, mass fraction of isopropanol 2%) was also tested.

The comparison demonstrates that the compatibility of the resin components is considerably improved by the use of the "styrenized epoxy resin". It is possible to produce a solvent-free dispersion which is comparable with the commercial product VEP 2385w but has a markedly higher degree of hardness.

It is thus possible, by combining the modification described in DE-A 43 27 493 corresponding to CA 2,125,254 with the present invention, to produce solvent-free dispersions having a markedly improved compatibility. The results are reported in Table I.

2. Dispersions for heat-curing systems

Synthesis of the base resin modified in accordance with the invention 898 g of the diglycidyl ether of bisphenol A (A1, epoxide equivalent weight about 185 g/mol), 698 g of a product A2 of 1 mol of bisphenol A (A2a) with 2 mol of styrene (A2b) (OH equivalent weight about 220 g/mol) and 304 g of a diglycidyl ether of polypropylene glycol 600 (A1) are heated to 125° C. 1.5 g of Shell® catalyst 1201 are added and then the mixture is maintained at 160° C. until an epoxide equivalent weight of from 760 to 765 g/mol is reached.

2.1 Dispersion according to the invention according to DE 41 28 487 corresponding to U.S. Pat. No. 5,236,974

Modified base resin, containing solvent 400 g of the resin according to the invention (2. above) are homogenized at 80° C. together with 39 g of methoxybutanol and 141 g of a 50% strength aqueous solution of a dispersant B1, as described in DE-A 36 43 751 corrsponding to U.S. Pat. No. 4,886,845. The resin is then dispersed with 258 g of water D by the method described in DE-A 41 28 487 corresponding to U.S. Pat. No. 5,236,974.

A storage-stable dispersion is obtained which has the following characteristics:

| | |
|---|---|
| viscosity (25° C., Brookfield) | 1575 mPa · s |
| residue (1 h/ 1 g, 125° C.) | 56.3% |
| epoxide equivalent weight (supply form) | 1614 g/mol |
| particle size (monomodal) | 650 nm |
| emulsifier content | 15% based on solids |
| solvent content | 10% based on solids |

2.2 Dispersion according to the invention according to DE-A 43 27 493 corresponding to CA 2,125,254

Modified base resin, free of solvent 401 g of the resin according to the invention are homogenized at 80° C. together with 39.6 g of a mixture of styrene, methyl methacrylate and glycidyl methacrylate (C1) (5:4:1) and 122 g of a 50% strength aqueous solution of a dispersant B1, as described in DE-A 36 43 751 corresponding to U.S. Pat. No. 4,886,845. The resin is then dispersed with 255 g of water D by the method described in DE-A 41 28 487 corresponding to U.S. Pat. No. 5,236,974. 0.40 g of tert-

TABLE I

| Dispersion | 1.1 | 1.2 (comparison) | 1.3 | VEP 2385w (comparison) |
|---|---|---|---|---|
| Notes | styrenized base resin | polyacrylate dispersion in epoxy resin dispersion | combination of 1.1 and 1.2 | commercial product |
| Viscosity | 913 mPa · s | 1480 mPa · s | 1810 mPa · s | 1000 mPa · s |
| Solids content | 54.5% | 56.0% | 55.8% | 56% |
| Epoxide equivalent weight | 1013 g/mol | 1078 g/mol | 1213 g/mol | 895 g/mol |
| Particle size | 820 nm | 338 nm | 425 nm | 650 nm |
| Emulsifier content | 10% on solids | 8% on solids | 8% on solids | 8% on solids |
| Solvent content | 10% on solids | 0% | 0% | 4.5% on solids |
| Pot life | 2 h | 2 h | 2 h | 1 h 45 min |
| Dust-dry after | 1 h 15 min | 1 h 30 min | 45 min | 30 min |
| Tack-free after | 7 h | 8 h | 5 h 30 min | 5 h 30 min |
| Leveling* | 0 | 0 | 0 | 0 |
| Film cloudiness* | 0 | 0 | 0 | 0 |
| Pendulum hardness after 24 h | 96 sec | 48 sec | 138 sec | 105 sec |
| Water resistance* after 24 h | 1 | 1–2 | 0–1 | 0–1 |

*Evaluation: 0 = very good to 5 = very poor butyl hydroperoxide and 0.045 g of iron(II) sulfate in the form of a 2% strength aqueous solution are added to the high-solids dispersion at 60° C. This is followed by the continuous addition of a solution of 0.53 g of ascorbic acid in 50 g of water over two hours. After the mixture has undergone post-polymerization for one more hour at 60° C., a further 35 g of water are added.

A storage-stable dispersion is obtained which has the following characteristics:

| | |
|---|---|
| viscosity (25° C., Brookfield) | 2140 mPa · s |
| residue (1 h, 1 g, 125° C.) | 56.4% |
| epoxide equivalent weight (supply form) | 1644 g/mol |
| particle size (monomodal) | 540 nm |
| emulsifier content | 12% based on solids |
| solvent content | 0% |

2.3 Comparison dispersion according to DE-A 41 28 487 corresponding to U.S. Pat. No. 5,236,974
Non-modified base resin, containing solvent 144 g of a polypropylene glycol diglycidyl ether having an epoxide equivalent weight of about 340 g/mol, 231 g of bisphenol A and 525 g of a diglycidyl ether of bisphenol A having an epoxide equivalent weight of 183 g/mol were reacted in accordance with Example 1.2 to give a product having an epoxide equivalent weight of 729 g/mol. 900 g of this resin are stirred thoroughly together with 90 g of methoxybutanol. After this, 302 g of dispersant (50% in water) are added according to DE-A 36 43 751, and dispersion is carried out in the usual manner.

A storage-stable dispersion is obtained which has the following characteristics:

| | |
|---|---|
| viscosity (25° C., Brookfield) | 1040 mPa · s |
| residue (1 h, 1 g, 125° C.) | 55.1% |
| epoxide equivalent weight (supply form) | 1463 g/mol |
| particle size (monomodal) | 589 nm |
| emulsifier content | 15% based on solids |
| solvent content | 10% based on solids |

2.4 Comparison dispersion according to DE-A 43 27 493 corresponding to CA 2,125,254
Non-modified base resin, free of solvent 286 g of base resin according to Example 2.3 are homogenized with 121 g of dispersant (50% strength in water) according to DE-A 36 43 751 corresponding to U.S. Pat. No. 4,886,845 and 57.2 g of a mixture of styrene, methyl methacrylate and glycidyl methacrylate (5:4:1) and the homogenized mixture is dispersed as usual, the monomers being polymerized as in Example 2.2.

A storage-stable dispersion is obtained which has the following characteristics:

| | |
|---|---|
| viscosity (25° C., Brookfield) | 1540 mPa · s |
| residue (1 h, 1 g, 125° C.) | 54.0% |
| epoxide equivalent weight (supply form) | 2361 g/mol |
| particle size (monomodal) | 465 nm |
| emulsifier content | 15% based on solids |
| solvent content | 0% |

Performance-related properties

The dispersions 2.1 to 2.4 are mixed with one equivalent of an acid-functional water-dilutable curing agent Beckopox® VEM 2436w, catalytic amounts of phosphoric acid are added, and the compositions are knife-coated as clearcoat onto tin plate, dry film thickness 5 μm. Curing is carried out at 200° C. for 12 minutes.

The testing configuration used is the standard testing for can coatings, taking into account pasteurization resistance.

The comparison demonstrates that the compatibility of the resin components is considerably improved by the use of the "styrenized epoxy resin". A solvent-free dispersion which was obtained by the method described in DE-A 43 27 493 corresponding to CA 2,125,254 can be produced, despite high proportions of styrene in the polyacrylate, in combination with the present invention, with substantially improved compatibility, enabling the production of completely solvent-free, pasteurization-resistant beverage can interior coatings. In this case it is even possible to reduce the content of dispersant. The results are reported in Table II.

TABLE II

| Dispersion | 2.1 | 2.2 | 2.3 (comparison) | 2.4 (comparison) |
|---|---|---|---|---|
| Notes | "styrenized base resin" | "styrenized base resin" with polyacrylate dispersion | nonmodified base resin | nonmodified base resin, with polyacrylate dispersion |
| Viscosity | 1575 mPa · s | 2140 mPa · s | 1040 mPa · s | 1540 mPa · s |
| Solids content | 56.3% | 56.4% | 55.1% | 54.0% |
| Epoxide equivalent weight | 1614 g/mol | 1644 g/mol | 1463 g/mol | 2361 g/mol |
| Particle size | 650 nm | 540 nm | 589 nm | 465 nm |
| Emulsifier content | 15% on solids | 12% on solids | 15% on solids | 15% on solids |
| Solvent content | 10% on solids | 0% | 10% | 0% on solids |
| Leveling* | 0–1 | 0–1 | 0–1 | 3 (haze) |
| Double wipes with acetone | 50 | 50 | 100 | 100 |
| Pasteurization | 0–1 | 0–1 | 0–1 | 0–1 |

*Evaluation: 0 = very good to 5 = very poor
Pasteurization: Water, 70° C., one hour

What is claimed is:

1. A stable, aqueous epoxy resin dispersion comprising:
   (A) an epoxy resin formed by condensation of
      (A-1) at least one epoxide compound having on average at least two epoxide groups per molecule, with
      (A-2) an aralkylated or alkylated polyhydroxy aromatic compound formed by reacting
         (A-2a) a polyhydroxy aromatic compound with
         (A-2b) an aromatic or aliphatic compound which carried an alkenyl group;
   (B) a dispersant;
   (C) a diluent selected from one or more low molecular weight, liquid, epoxy-functional compounds (C2); and
   (D) water.

2. A stable aqueous epoxy resin dispersion as claimed in claim 1, where (A-2) comprises an aralkylated polyhydroxy aromatic compound.

3. A stable, aqueous epoxy resin dispersion as claimed in claim 1, wherein component (A1) comprises an epoxide compound which has an epoxide equivalent weight of from 100 to 2000 g/mol.

4. A stable, aqueous epoxy resin dispersion as claimed in claim 1, wherein the dispersant (B) comprises a condensation product (B1) of a polyol (B1a) and an epoxide compound (B1b) having at least two epoxide groups per molecule.

5. A stable, aqueous epoxy resin dispersion as claimed in claim 4, wherein the dispersant (B) additionally comprises at least one surfactant (B2).

6. A stable, aqueous epoxy resin dispersion as claimed in claim 1, which is free from organic solvent.

7. A stable, aqueous epoxy resin dispersion as claimed in claim 1, wherein the average particle size of the dispersed resin is less than 1 μm.

8. A stable, aqueous epoxy resin dispersion as claimed in claim 4, wherein the dispersant comprises a condensation product (B1) of a polyetherpolyol (B1a) and a polyglycidyl ether (B1b).

9. A stable, aqueous epoxy resin dispersion as claimed in claim 1, which further comprises an addition polymer formed from olefinically unsaturated monomers.

10. A stable, aqueous epoxy resin dispersion as claimed in claim 1, which additionally comprises one or more organic solvents.

11. A stable, aqueous epoxy resin dispersion comprising:
   (A) an epoxy resin formed by condensation of
      (A-1) at least one epoxide compound having on average at least two epoxide groups per molecule, with
      (A-2) an aralkylated or alkylated polyhydroxy aromatic compound formed by reacting
         (A-2a) a polyhydroxy aromatic compound with
         (A-2b) an aromatic or aliphatic compound which carried an alkenyl group;
   (B) a dispersant;
   (C) an addition polymer prepared by free-radical polymerization of olefinically unsaturated monomers (C1) in the presence of epoxy resin (A);
   (D) water.

12. A stable aqueous epoxy resin dispersion as claimed in claim 11, wherein the polymer (C) is prepared by the polymerization of monomers (C1) with one or more free-radical initiators in the presence of a dispersion of the epoxy resin (A) in water (D).

13. A stable, aqueous epoxy resin dispersion as claimed in claim 11, wherein the ratio by mass of epoxy resin (A) to the addition polymer (C) is from 99.5:0.5 to 20:80.

14. A process for the preparation of a stable, aqueous epoxy resin dispersion as claimed in claim 11, which comprises:
   preparing an epoxy resin (A) from the epoxide compound (A1) and the aralkylated polyhydroxy aromatic compound (A2),
   dispersing the modified epoxy resin (A) in water with the addition of a dispersant (B) and of at least one olefinically unsaturated monomer (C1), and
   polymerizing (C1) by adding a radical-forming initiator to form addition polymer (C).

15. A process as claimed in claim 14, where in addition to the monomers (C1), at least one substance is added to epoxy resin (A) which is selected from low molecular weight, liquid epoxide compounds (C2) and inert organic solvents (C3), conjointly with, prior to, or following the addition of the monomer (C1).

16. A stable, aqueous epoxy resin dispersion as claimed in claim 11, wherein the dispersant (B) comprises a condensation product (B1) of a polyol (B1a) and an epoxide compound (B1b) having at least two epoxide groups per molecule.

17. A stable, aqueous epoxy resin dispersion as claimed in claim 16, wherein the dispersant comprises a condensation product (B1) of a polyetherpolyol (B1a) and a polyglycidyl ether (B1b).

18. A stable aqueous epoxy resin dispersion as claimed in claim 11, where (A-2) comprises an aralkylated polyhydroxy aromatic compound.

19. A stable aqueous epoxy resin dispersion as claimed in claim 11, where the olefinically unsaturated monomers (C1) contain functional groups capable of curing the epoxy resin (A).

20. A stable aqueous epoxy resin dispersion as claimed in claim 11, wherein the epoxy resin (A) is cured.

21. A stable aqueous epoxy resin dispersion as claimed in claim 11, wherein (A-2b) is an aromatic compound which carried an alkenyl group.

22. A stable aqueous epoxy resin dispersion as claimed in claim 11, wherein (A-2b) is an aromatic compound which carried an alkenyl group.

23. A stable aqueous epoxy resin dispersion as claimed in claim 1, wherein (A-2b) comprises an aliphatic compound selected from vinyl esters, vinyl ethers, esters of acrylic or methacrylic acid with monoalcohols having 1 to 18 carbon atoms, or hydroxyl $C_2$- to $C_4$- alkyl (meth)acrylates.

24. A stable aqueous epoxy resin dispersion as claimed in claim 11, wherein (A-2b) comprises an aliphatic compound selected from vinyl esters, vinyl ethers, esters of acrylic or methacrylic acid with monoalcohols having 1 to 18 carbon atoms, or hydroxyl $C_2$- to $C_4$- alkyl (meth)acrylates.

25. A stable epoxy resin dispersion as claimed in claim 1, wherein the mass of component (C2) is from 1 to 25% based on the sum of the masses of components (A) and (C).

26. A stable epoxy resin dispersion as claimed in claim 1, wherein the diluents (C2) are selected from the group consisting of para-tert, butylphenyl glycidyl ether, n-butyl glycidyl ether, phenyl glycidyl ether, ortho-cresyl glycidyl ether, butanediol diglycidyl ether, hexanediol diglycidyl ether, neopentylglycol diglycidyl ether, dimethylolcyclohexane diglycidyl ether, 2-ethylhexyl glycidyl ether, versatic acid glycidyl ester, and the diglycidyl ethers of bisphenol A and bisphenol F.

* * * * *